No. 870,270. PATENTED NOV. 5, 1907.
W. C. BROWN.
MIXER FOR SPRAYING PURPOSES AND THE LIKE.
APPLICATION FILED NOV. 6, 1905.
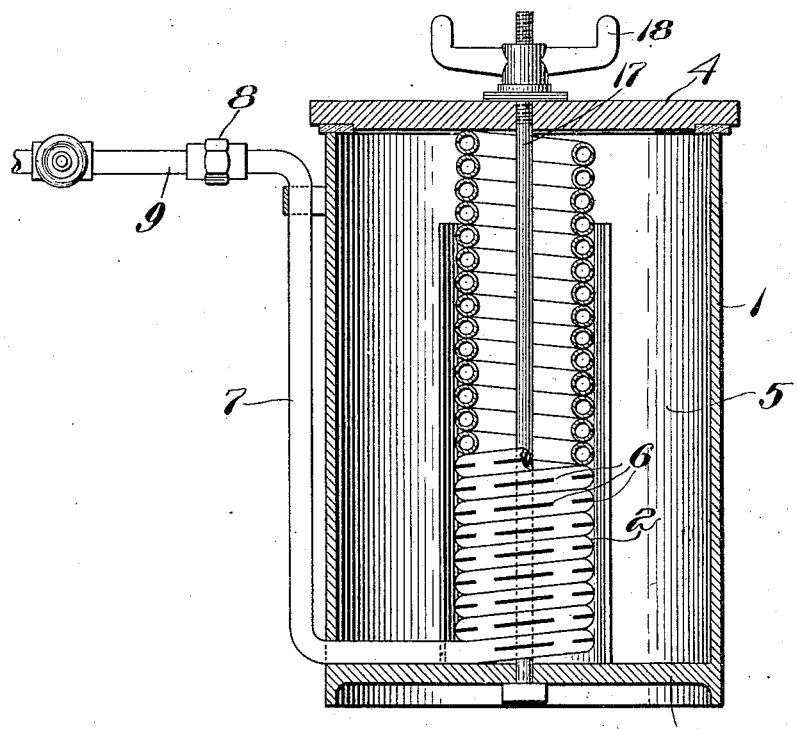
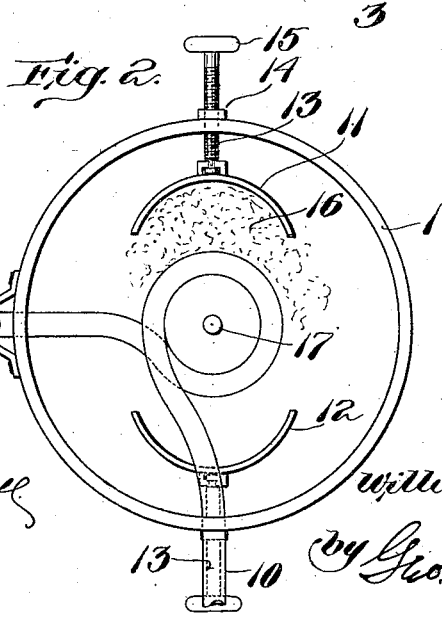
Witnesses:
Inventor:
William C. Brown,
by Geo. H. Maxwell,
Attorney.

UNITED STATES PATENT OFFICE.

WILLIAM C. BROWN, OF MELROSE, MASSACHUSETTS.

MIXER FOR SPRAYING PURPOSES AND THE LIKE.

No. 870,270.　　　　Specification of Letters Patent.　　　　Patented Nov. 5, 1907.

Application filed November 6, 1905. Serial No. 285,972.

*To all whom it may concern:*

Be it known that I, WILLIAM C. BROWN, a citizen of the United States, residing at Melrose, in the county of Middlesex and State of Massachusetts, have invented an Improvement in Mixers for Spraying Purposes and the Like, of which the following description, in connection with the accompanying drawings, is a specification, like letters on the drawings representing like parts.
For many uses it is desirable to have a uniform and constant admixture of a solid and a liquid, as, for example, in connection with spraying bushes, trees and plants with poisons, etc., it is usual to provide the poison in the form of a solid or of a paste or powder and then mix it with water by agitation, various means having been invented for this purpose.

I have discovered that it is possible to do the mixing automatically simply by the passage of the water itself, provided the latter is given a rotary or whirling movement and is driven with force through a confined space so as to act somewhat upon the injector principle, thereby operating and mixing with the solid or paste and carrying the mixture back into the swiftly flowing channel or pipe ready for discharge.
My invention may be carried out in many different ways, my preferred construction consisting of a central coil of pipe having external slits throughout more or less of its length, mounted in a cylindrical inclosure containing the substance with which the water is to be mixed. This pipe is connected to a hydrant or other source of water supply and the mere passage of the water under pressure produces the desired results.

The further construction and advantages of my invention will be pointed out more at length in the course of the following description, reference being had to the drawings in which I have shown a preferred embodiment of the invention, and the latter will be more particularly defined in the appended claims forming a part of this specification.
In the drawings, Figure 1 is a central, vertical longitudinal section of a mixer constructed according to my invention; and Fig. 2 is a top plan view thereof the cover being removed.

In a suitable receptacle 1 of any convenient size and shape, herein shown as tubular, I mount centrally a coil 2 of pipe, herein shown as extending from the bottom 3 to the cover 4 and tightly coiled so as practically to form the inner wall of an annular chamber 5 whose outer wall is the cask or receptacle 1. This vertical coil 2 is provided along its outer surface with longitudinal slits 6 which are varied in size to suit different kinds of mixtures. The annular space 5 is filled with the poisonous or other material, for example, it may be filled with a carbolic paste or with whale-oil soap and paris green or other poison, when used for treating rose bushes. The inlet pipe 7 is provided with a union 8 whereby it may be coupled to a sill-cock or other source 9 of water supply, and the other end of the coil extends outwardly at 10 to a spraying nozzle or other discharge device. Preferably also I provide opposite regulators 11 12, herein shown in the form of curved shields carried by screw rods 13 passing through threaded bushings 14 and operated by a hand wheel 15. These regulators or shields serve the double purpose of pressing the contained paste, indicated at 16, forward into direct contact with the coil when desired, and also of closing or cutting off more or less of the coil from action when desired.

Any suitable closing device may be used, the cover 4 being herein shown as secured by a rod 17 and hand-nut 18.

My apparatus is portable, cannot readily get out of order, depends on no moving parts, and is entirely automatic, being controlled solely by the water faucet or cock.

In use, the union 8 is attached to the sill-cock or other source of water pressure and supply and as soon as the water is admitted it flows rapidly through the coil and escapes through the slits 6 in just sufficient quantity to form a solution with the adjacent portion of the contained mass of paste 16 and because of the continued and rapid forward flow of the water in the coil 2, this mixed solution thus formed is at once sucked back into the pipe and travels rapidly forward to be discharged at the outlet 10. This process is continued until all the contained paste or foreign substance 16 has been mixed with the water and discharged. In order to increase the quantity of foreign substance 16 admixed with the water, the hand-wheels 15 are turned forward slightly so as to bring the paste or foreign ingredients 16 into more forcible and direct contact with the coil. If on the other hand it is desired to decrease the activity of the mixing without changing the water pressure, one or both of the shields or controlling devices 11, 12 are moved forward into direct contact with the coil, the paste being pressed from between the coil and the shield as the latter is moved forward. It will be observed that the shields are not quite semi-circular in extent and hence will not entirely cut off all mixing capacity.

Various other forms of controlling devices may be employed. Also I wish it understood that I regard myself as the inventor broadly of an automatic hydraulic mixer in which the mixing is done simply by the force and gyratory movement of the water being discharged.

Not only is the mixing automatic in that no movable mechanism is required, but it remains practically uniform.

Having described my invention, what I claim as new and desire to secure by Letters Patent, is:

1. A mixer, comprising a receptacle provided with a chamber for the solid ingredients, and a water pipe provided with means to coöperate with the flow of liquid through said pipe to draw in said ingredients to be carried along with the liquid.

2. A mixer, comprising a receptacle provided with a chamber for the solid ingredients, and a water pipe provided with means to coöperate with the flow of liquid through said pipe under pressure to produce a gyratory motion in the chamber and draw in said ingredients to be carried along with the liquid.

3. A mixer, comprising a receptacle provided with a chamber for the solid ingredients, and a continuous pipe extending through said passage having an inlet at one end and an outlet at the other end, said pipe within said passage being provided with slits for the escape and entrance of liquid.

4. A mixer, comprising a receptacle provided with a chamber for the solid ingredients, and a coil of pipe arranged coaxially of said chamber, provided at one end with an inlet and at the other end with an outlet, for the continuous flow of liquid, and having a series of slits or openings in the side of the coil next to the contained ingredients.

5. A mixer, comprising a receptacle having a centrally arranged liquid conductor provided with means for producing a gyratory movement of the liquid, said conductor having external openings for the escape of the liquid into said receptacle, and means, operated independently of the flow of liquid, for regulating the mixing effects of said liquid.

6. A mixer, comprising a receptacle, containing a chamber for holding the solid ingredients to be mixed, a central liquid conveyer provided with means for delivering liquid to said ingredients with a whirling movement and for receiving the mixture back into said conveyer, and means for moving said ingredients toward said conveyer.

In testimony whereof, I have signed my name to this specification, in the presence of two subscribing witnesses.

WILLIAM C. BROWN.

Witnesses:
 GEO. H. MAXWELL,
 M. A. JONES.